(12) United States Patent
Duan et al.

(10) Patent No.: US 7,969,963 B2
(45) Date of Patent: Jun. 28, 2011

(54) METHOD FOR ESTIMATING RELATIVE CLOCK FREQUENCY OFFSETS TO IMPROVE RADIO RANGING ERRORS

(75) Inventors: Chunjie Duan, Medfield, MA (US); Giovanni Vannucci, Red Bank, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 859 days.

(21) Appl. No.: 11/959,974

(22) Filed: Dec. 19, 2007

(65) Prior Publication Data
US 2010/0172339 A1    Jul. 8, 2010

(51) Int. Cl.
*H04J 3/06*    (2006.01)
*G01S 3/02*    (2006.01)

(52) U.S. Cl. ........................................ 370/350; 342/458
(58) Field of Classification Search .................... None
See application file for complete search history.

(56) References Cited

U.S. PATENT DOCUMENTS
4,860,287 A * 8/1989 Kelly ............................ 370/517
6,327,274 B1 * 12/2001 Ravikanth ..................... 370/516
2007/0143105 A1 * 6/2007 Braho et al. .................. 704/231
2007/0200759 A1 * 8/2007 Heidari-Bateni et al. ..... 342/387
2007/0286121 A1 * 12/2007 Kolakowski et al. ......... 370/329
2008/0284639 A1 * 11/2008 Sahinoglu ..................... 342/125

OTHER PUBLICATIONS
U.S. Appl. No. 11/749,517, filed Jun. 30, 2007, Sahinoglu.
* cited by examiner

*Primary Examiner* — Daniel J Ryman
*Assistant Examiner* — John Blanton
(74) *Attorney, Agent, or Firm* — Dirk Brinkman; Gene Vinokur

(57) ABSTRACT

A method and system improves two-way radio ranging accuracy by estimating a relative clock frequency offset between a first clock X of a first transceiver and a second clock Y a second transceiver. The first transceiver transmits a first packet at time $t_0$ received by the second transceiver at a time $t_1$. The second transceiver transmits a second packet at a time $t_2$ received by first transceiver at a time $t_3$. The second transceiver transmits a third packet at a time $t_4$ received at a time $t_5$. The relative clock frequency offset is then $$\Delta f^r_{XY} \cong \frac{2f(N^Y_{24} - N^X_{35})}{N^Y_{24} + N^X_{35}},$$

where f is a nominal clock frequency of the first and second clocks, $N^Y_{24}$ is a measured first delay between times $t_2$ and $t_4$ of the second clock, $N^X_{35}$ is a measured second delay between times $t_3$ and $t_5$ of the first clock X.

10 Claims, 5 Drawing Sheets

METHOD FOR ESTIMATING RELATIVE CLOCK FREQUENCY OFFSETS TO IMPROVE RADIO RANGING ERRORS

FIELD OF THE INVENTION

This invention relates to wireless communication systems, and more particularly, to accurate ranging estimation through relative clock frequency offsets (RCFO) compensation between wireless devices.

BACKGROUND OF THE INVENTION

In many wireless communication networks, devices are not synchronized to a single reference clock. Instead, each device relies on its own clock. Due to the limitation of the hardware, manufacturing processes, temperature drift, component aging, etc., the actual operating frequency of the clock is generally different from the designed nominal frequency. For example, if a 100 MHz clock signal is generated by a crystal that has a tolerance of +/−20 parts per million (ppm), the actual frequency of the clock can be any value in a range from 99,998,000 Hz to 100,002,000 Hz.

A difference between the actual frequency of the clock and the designed nominal frequency is referred to as the 'clock frequency offset' (CFO) or 'absolute clock frequency offset' (ACFO). The difference between the frequencies of two independent clocks (with the same nominal frequency) is called 'relative clock frequency offset' (RCFO). For example, for two clocks with nominal frequency of 100 MHz, if one clock has a frequency of 99,998,000 Hz and the other clock has a frequency of 100,002,000 Hz. The RCFO is 4 KHz, or 40 ppm.

The CFO and RCFO can cause problem. When the clock is used for time measurement, the ACFO and/or RCFO introduce errors. In digital circuit, time is generally measured as the number of clock cycles between two time instances $$N = \frac{t}{T_{actual}} = t \cdot f_{actual},$$

where $T_{actual}$ is the actual clock period, and $f_{actual}$ is the actual clock frequency. As an example, a timer based on an accurate 100 MHz clock will count 100,000 clock cycles in a 1 millisecond period. If the ACFO is −20 ppm, the actual count is ~99,998 clock cycles instead. If the ACFO is not compensated, which is often the case when the device has not knowledge of the ACFO of its own clock, then the time is simply computed using the nominal frequency:

$$\begin{aligned} t &= N \cdot T_{norm} \\ &= \frac{N}{f_{norm}} \\ &= t \cdot \frac{f_{actual}}{f_{norm}} \\ &= t + t \cdot \frac{\Delta f_{abs}}{f_{norm}} \end{aligned} \quad (1)$$

where $T_{norm}$ is the nominal clock period, $f_{norm}$ is the nominal clock frequency, and $\Delta f_{abs}$ is the ACFO. In the example, $f_{norm}$=100 MHz, t=999,980 ns, which results in a 20 ns time error.

If the same time period is measured by two devices using independent clocks, the RCFO causes a discrepancy in the measurements. For example, if the nominal clock frequency is 100 MHz for both timer X and timer Y, timer X has a −20 ppm offset and timer Y has a +20 ppm offset, which is a RCFO of 40 ppm. A 1 msec time period will be measured as 99,998,000 ns and 100,002,000 ns respectively for timer X and timer Y, a difference of 40 ns.

The RCFO has a significant impact on the ranging accuracy of a two-way TOA (TW-TOA) system. A TW-TOA is a method can also be used for ranging between two transceivers. TW-TOA does not require exact synchronization between the transmitter and receiver. The TW-TOA ranging method is used in the IEEE 802.15.4a standard.

In TW-TOA, two transceivers exchange packets and the round trip delay is measured. A typical exchange is as follows: the first device transmits a packet to the second device. After receiving the packet, the second device transmits a packet back to the first device. The first device measures the total time elapsed from the transmission of the first packet to the reception of the second packet. The second device measures the time elapsed from the reception of the first packet to the transmission of the second packet. The round trip travel time of the signal is calculated as the difference between these two measured values. The distance between the devices is calculated as the product of one half of the round trip traveling time multiplied by the speed of the signal ($3\times10^8$ meter/sec in free space for electromagnetic signal).

Because the turnaround time at the second device is much larger than the signal 'flying' time, the error caused by RCFO is the dominant factor in the overall time estimation error for a TW-TOA system. If the devices can obtain an accurate estimation of the RCFO, then the time estimation accuracy can be improved by compensating for it. Clearly, an accurate RCFO estimation is very important in achieving accurate time measurement.

FIG. 4 shows a prior art ranging procedure. Device X transmits a request packet (ranging-req) 111 at time $t_0$. The packet is received by device Y at time $t_1$. After some delay, device Y transmits an acknowledge packet (ranging-ack) 112 at time $t_2$. The range-ack packet is received by device X at time $t_3$. The turn-around delay $t_{12}$ is measured by device Y and sent to device X either in the ranging-ack packet, or in a separate packet (ranging-data). The delay $t_{03}$ is measured by device X.

Let $t_p$ be the 'fly' time of the signal. Without considering the frequency offsets, the estimated round-trip fly time is $$2 \cdot t'_p = t^X_{03} - t^Y_{12},$$

and $t^X_{03}$ the measured round-trip time from the transmission of the range-request packet to the reception of the range-acknowledge packet by device X based on its clock $clk_X$, and $t^Y_{12}$ is the measured turn-around time from the beginning of the received ranging-request packet to the beginning of the transmitted ranging-acknowledge packet by device Y based on its clock $clk_Y$.

The range between device X and Y is $$D_{XY} = t'_p \cdot C,$$

where C is the speed of the electromagnetic signals, e.g., $3\times10^8$ m/sec in free space.

Because the true round-trip fly time is $$2 \cdot t_p = t_{03} - t_{12},$$

$$t^X_{03} = N^X_{03}/f = t_{03} \cdot f_X/f, \text{ and}$$

$$t^Y_{12} = n^Y_{12}/f = t_{12} \cdot f_Y/f, \text{ and}$$

the estimation error is $$\Delta t_p = t'_p - t_p = (t^X_{03} - t^Y_{12}) - (t_{03} - t_{12}).$$

Given that the process time is much longer than the fly time and $t_{12} \gg 2t_p$, $$\Delta t_p = (t^X_{03} - t_{03}) - (t^Y_{12} - t_{12}) = t_{12}(\Delta f_{XY}/f) + 2t_p(\Delta f_X/f \approx t_{12}(\Delta f_{XY}/f)),$$

where $\Delta f_X$ is the frequency offset of the timer clock with respect to the nominal frequency f and $\Delta f_{XY}$ is the relative frequency offset between the timer clock for device X and the timer clock for device Y. The above equation indicates that reducing $t_{12}$ and $\Delta f_{XY}/f$ will improve the time estimation accuracy. However, in practice, the desired improvements may not be feasible. $\Delta f_{XY}/f$ is determined by the components performance (in particular, the crystal oscillator) and a higher accuracy/stability components are more costly and may require more complicated circuit design.

The process time, $t_{12}$ is often determined by several factors and cannot be easily reduced because many communication standards impose a quite period between transmissions, and the receiving device must process the data and pass the packet to the upper layer and the processing time is long, and the length of the payload portion of the packet is often non-zero.

Conventional methods for estimating the RCFO in wireless systems include the following.

One method uses the preamble of a received packet. Generally the preamble of the packet includes multiple symbols. By measuring a length of the preamble or a time interval between two symbols, the receiving device can estimate the RCFO of its clock with respect to the clock of the transmitting device. Such a method does not yield an accurate RCFO estimation because the preamble has a finite duration. Therefore, the time interval between two symbols cannot be very large, the method does not benefit from the processing gain by using as many symbols in the preamble, and the method is sensitive to carrier frequency offset and sample timing errors.

A symmetric double-sided two-way protocol exchange data/ranging packet between two devices in the following sequence:
  Device A transmits a first packet;
  Device B receives the first packet;
  Device B transmits a second packet;
  Device A receives the second packet;
  Device A transmits a third packet; and
  Device B receives the third packet.
  Devices A and B exchange the timing information in additional data packets.
  Device A measures a round trip time $t_{roundA}$ between transmitting the first packet and receiving the second packet. Device B measures a reply time $t_{replyB}$ between receiving the first packet and transmitting the second packet, and device A measures a reply time $t_{replyA}$ between receiving the second packet and transmitting the third packet.

The drawbacks of such a method are: the times $t_{replyA}$ and $t_{replyB}$ must be identical or very close in order to cancel out the error caused by the RCFO; additional transmissions are needed to pass the information from one device to the other device; and delay mismatches in RF frond ends of two devices may introduce additional errors.

Another method uses a combination of preamble and payload section or possibly post amble, see U.S. patent application Ser. No. 11/749,517, "Method for Reducing Radio Ranging Errors Due to Clock Frequency Offsets," filed by Sahinoglu on Jun. 30, 2007, incorporated here in by reference.

Another method uses frequency domain analysis. By performing a fast Fourier transform (FFT) on part or all of the preamble of a packet, the RCFO can be estimated. This approach requires the storage of a large number of samples, a complex FFT operation and therefore requires additional hardware, software and power. The accuracy is dependent on the signal-to-noise ratio (SNR) of the received signal and the size of the preamble portion used for FFT.

It is desired to provide a method for estimating the RCFO without the above problems and complexities.

SUMMARY OF THE INVENTION

The invention provides a method for estimating a relative clock frequency offset (RCFO) between two wireless communication devices with asynchronous clocks by performing a data packet exchange. The method minimizes range estimation error in a two-way time-of-arrival (TOA) measurements.

A first transceiver transmits a first packet. A second transceiver transmits a second packet, and then, after a first delay a third packet. The first transceiver receives the second packet, and then after second delay the third packet. The relative clock frequency offset is determined from the measured first and second delays.

BRIEF DESCRIPTION OF THE DRAWINGS

FIG. 3 is a timing diagram of time error caused by clock frequency offsets; and.

DETAILED DESCRIPTION OF THE PREFERRED EMBODIMENTS

Wireless Ranging Devices

Figure 1:
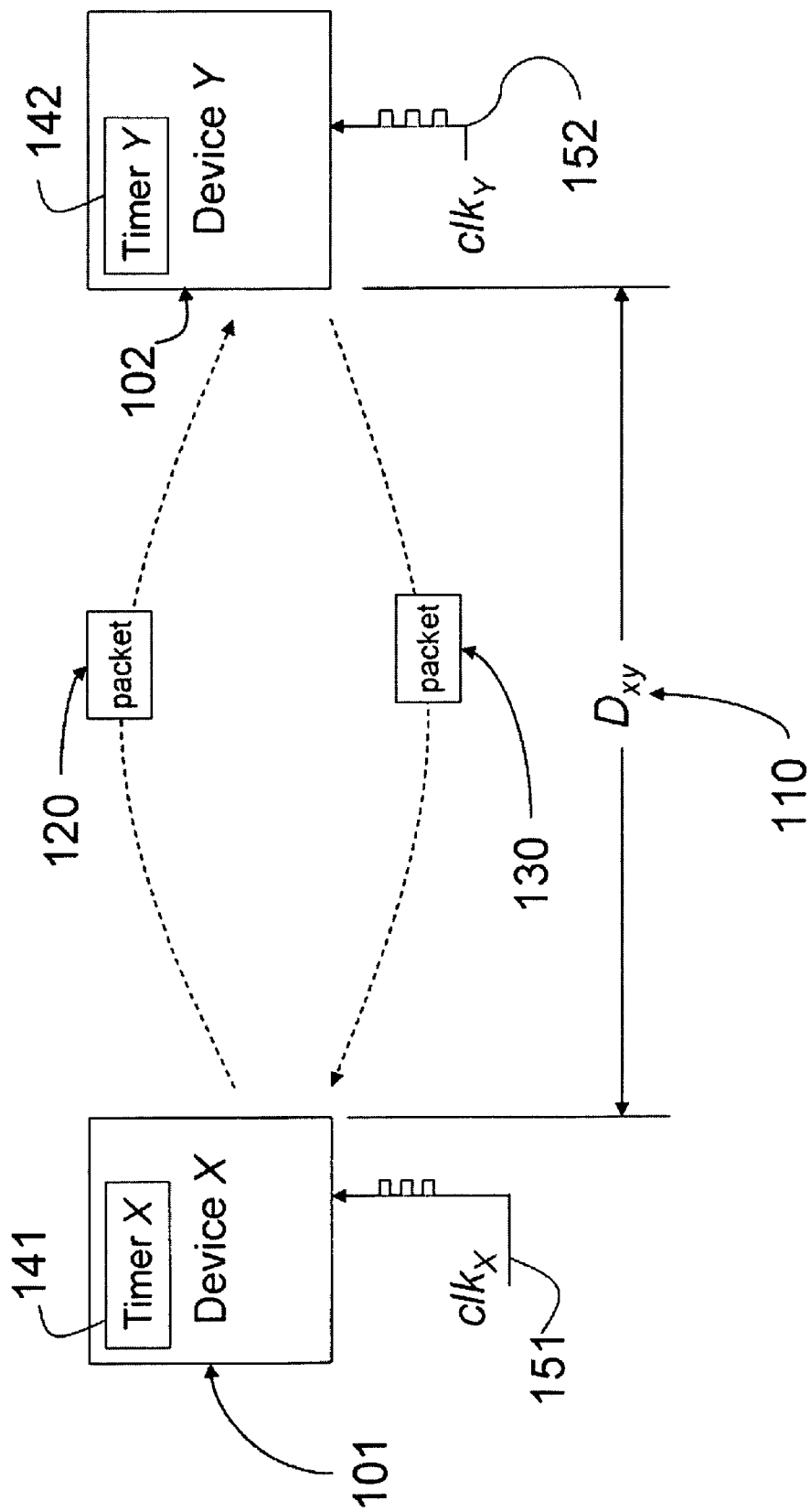
FIG. 1 is a block diagram of two devices communicating with each other by exchanging packets according to an embodiment of the invention.

FIG. 1 shows wireless communication device X 101 and device Y 102 according to an embodiment of the invention. A distance between device X and device Y is $D_{XY}$ 110. Device X can transmit a data packet 120 to device Y, and device Y can transmit a data packet 130 to device Y. FIG. 1 also shows timer X 141 and timer Y 142, and clock signals $clk_X$ 151 and $clk_Y$ 152. The timers count the clock signals. The timers are identical other than that count clock signals having different frequencies due to offsets from their nominal (design) frequency. A device may have multiple timers.

Timers

Figure 2:
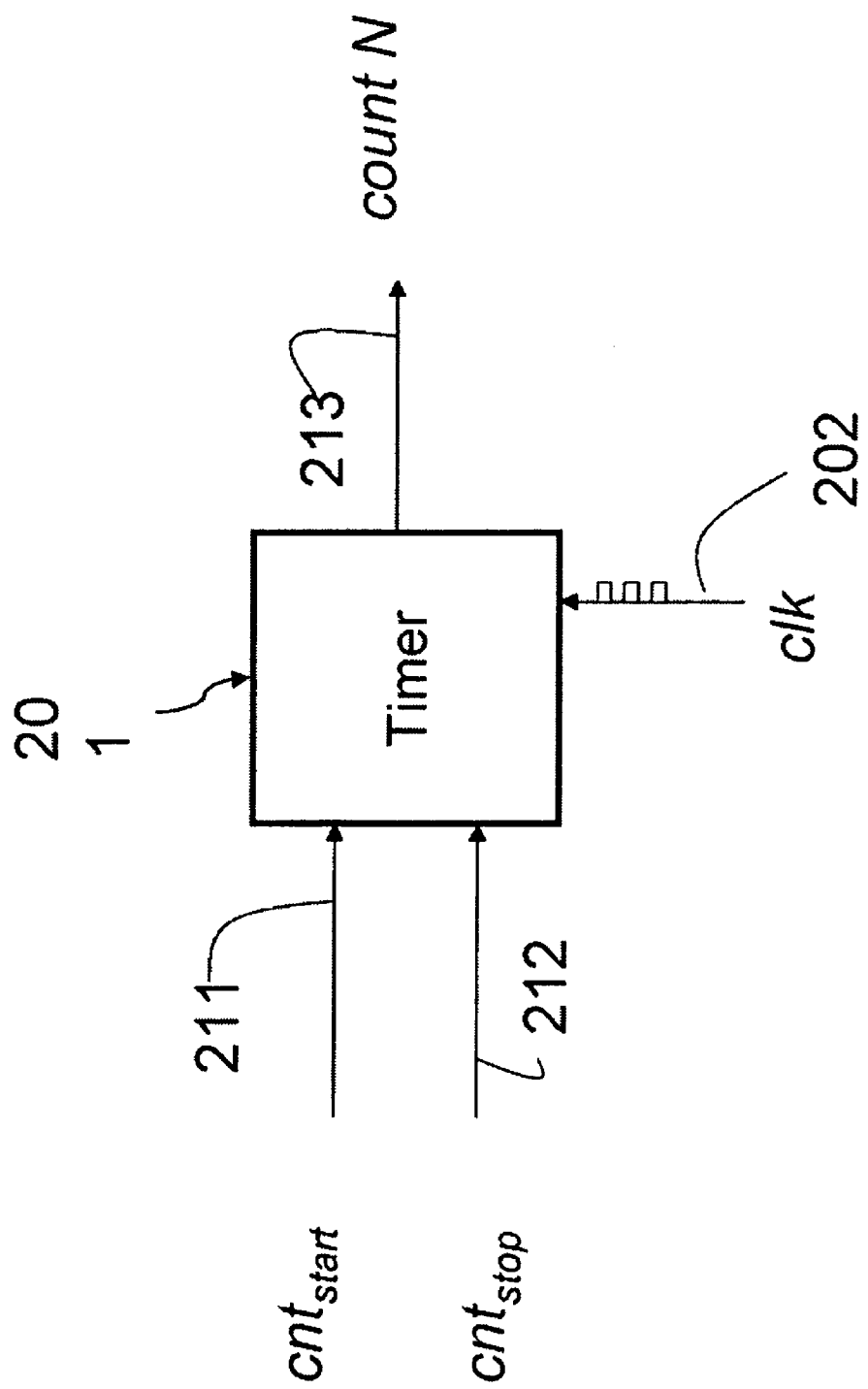
FIG. 2 is a block diagram of a timer according to an embodiment of the invention.

FIG. 2 generally shows a timer 201 operated according to a signal clk 202 having a nominal clock frequency $f_{norm}$. Of course, the nominal frequency is known at both devices. The time 201 forms the basis for timers 141-142.

The timer starts counting when a signal $cnt_{start}$ 211 is active (ON), and stops counting when $cnt_{stop}$ 212 is active. The timer outputs a count N 213 and the time elapsed from $cnt_{start}$ to $cnt_{stop}$ can be determined using $$N = (t_{stop} - t_{start}) f_{norm}.$$

Relative Clock Frequency Offsets (RCFO)

Figure 3:
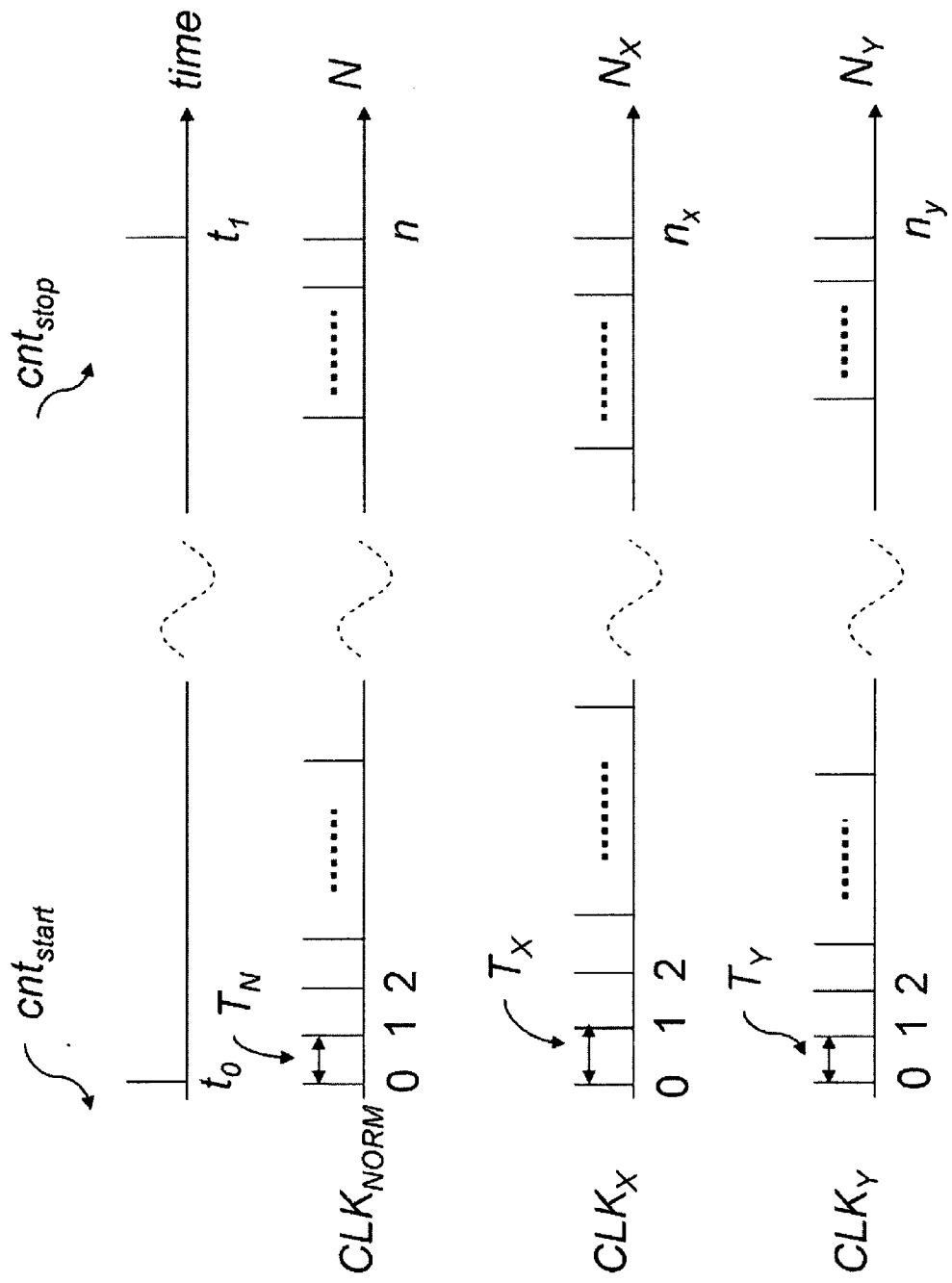
Figure 4:
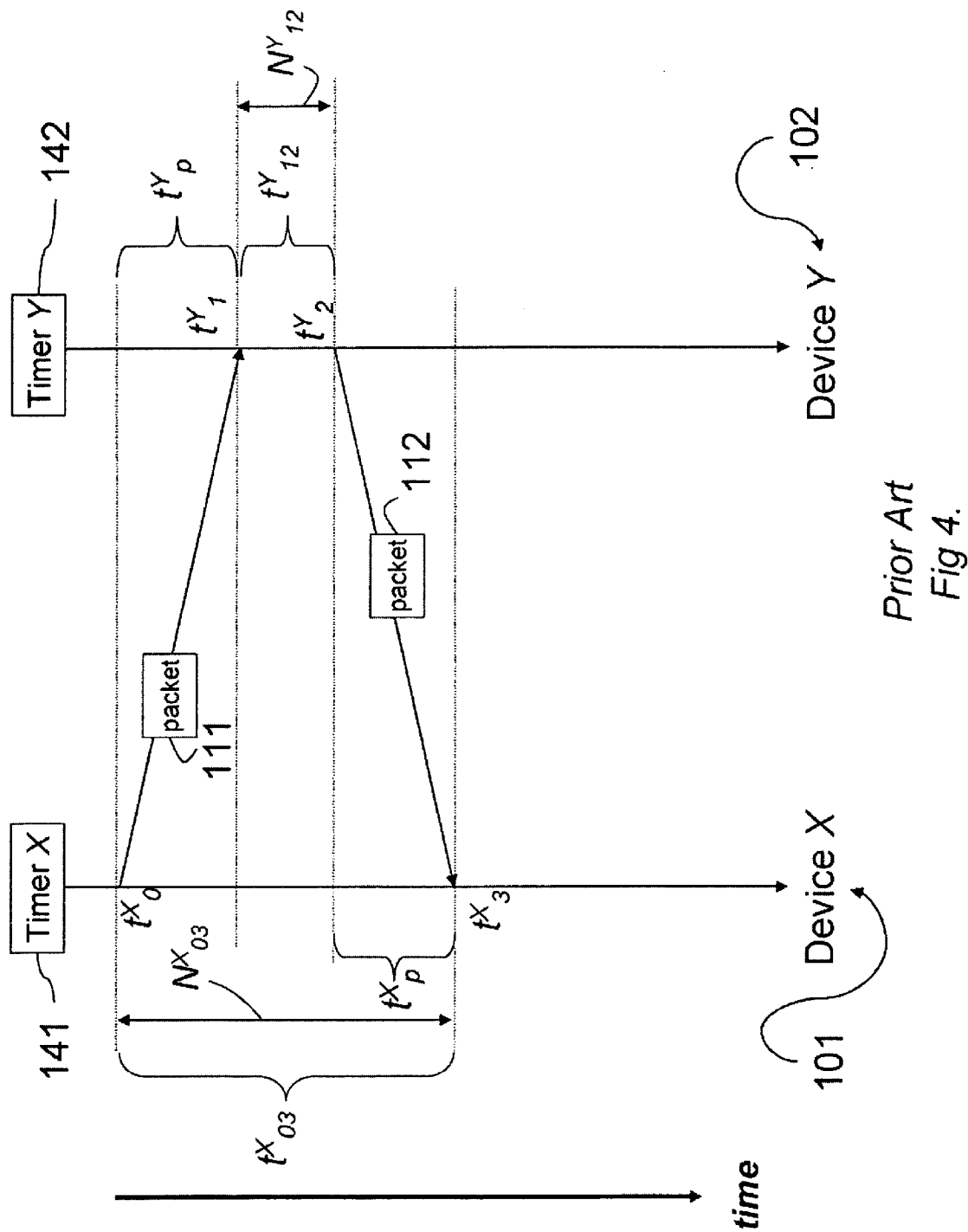
FIG. 4 is a timing diagram of a packet exchanges protocol between two devices without RCFO estimation.

FIG. 3 shows a time measurement error caused by clock frequency offset. At a time $t_0$, the $cnt_{start}$ signal is active, and the timer starts counting. Then, at a time $t_1$, the $cnt_{stop}$ is active and the timer stops counting.

If the nominal clock frequency of the timer is $f_{norm}$, then the output count is N. If the actual clock frequency of timer X is $f_X$, then the output count of timer X is $N_X$. If the actual clock frequency of time Y is $f_Y$, then the output count of time Y is $N_Y$ given as follows:

$$N = t \cdot f;$$

$$N_X = t \cdot f_X = t \cdot (f + \Delta f_X) = N + t \cdot \Delta f_X = N + \Delta N_X;$$

$$N_Y = t \cdot f_Y = t \cdot (f + \Delta f_Y) = N + t \cdot \Delta f_Y = N + \Delta N_Y; \text{ and}$$

$$\Delta N = N_X - N_Y = (N + t \cdot \Delta f_X) - (N + t \cdot \Delta f_Y) = t \cdot (\Delta f_X - \Delta f_Y) = t \cdot \Delta f_{XY},$$

where $\Delta f_X$ is the frequency error of clock X with respect to the nominal frequency f; $\Delta f_Y$ is the frequency error of clock Y with respect to the nominal frequency f; $\Delta f_{XY}$ is the relative frequency error between clock X and clock Y. $\Delta N_X$ and $\Delta N_Y$ are the count error with, respect to the nominal count N.

If $N_{avg} = (N_X + N_Y)/2$, then t can be approximated as:

$$t = \frac{(N_X + N_Y)}{2f} - \frac{(\Delta N_X + \Delta N_Y)}{2f} \approx \frac{N_{avg}}{f},$$

and $$\Delta N = t \cdot \Delta f_{XY} \approx \frac{N_{avg}}{f} \cdot \Delta f_{XY} = \frac{N_X + N_Y}{2 \cdot f} \cdot \Delta f_{XY}.$$

If $N_X$, $N_Y$ and the nominal frequency f are known, the relative clock frequency offset is $$\Delta f_{XY} \cong \frac{2f(N_X - N_Y)}{N_X + N_Y}.$$

RCFO Protocol

Figure 5:
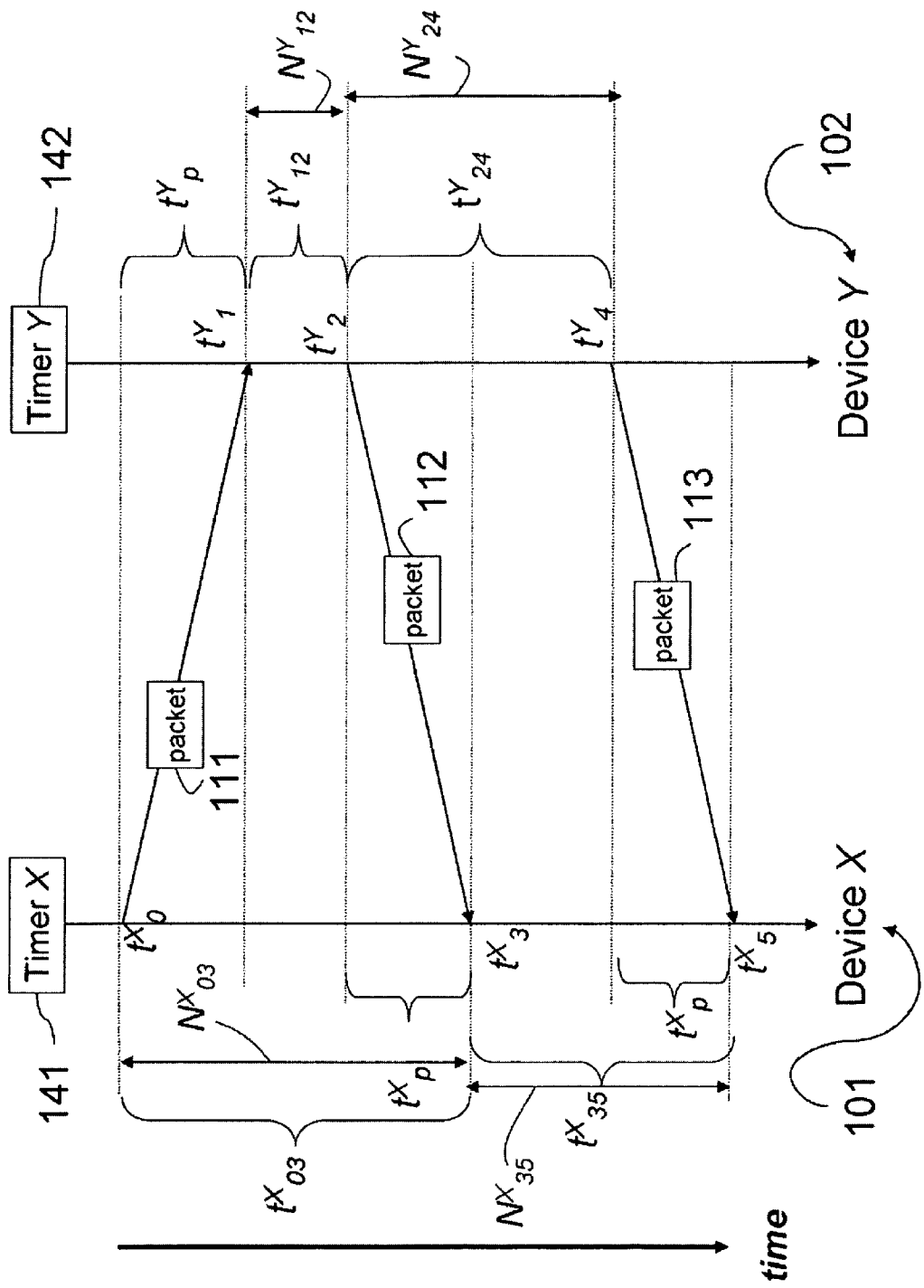
FIG. 5 is a timing diagram of a packet exchanges protocol between two devices according to an embodiment of the invention.

FIG. 5 shows a packet exchange protocol and an associated RCFO estimation method according to an embodiment of the invention. In FIG. 5, the time axis runs down. In the following, the timing information at device X is with respect to clock X and timer 151, and at device Y with respect to clock Y and time 152. This is implicitly understood and explicitly indicated in the superscripts and subscripts. Thus, in FIG. 5, the times t are equivalent to the clock counts N, as shown.

At time $t_0$, device X transmits a ranging request packet 111. Device Y receives the ranging request packet at time $t_1$.

After receiving the ranging request packet and a delay of $t_{12}$, device Y transmits a ranging acknowledgement packet 112 at time $t_2$. Device X receives the ranging acknowledgement packet at time $t_3$.

After receiving the ranging request packet 111 and a first delay $t_{24}$, device Y transmits a ranging data 113 at time $t_4$. Device X receives the ranging data packet at time $t_5$.

The estimated round trip time without considering the frequency offsets is $$2 \cdot \dot{t}_p = t^X_{03} - t^Y_{12},$$

where, $t^X_{03}$ is the measured round trip time transmitting the ranging request packet to receiving the range acknowledge packet by device X determined as $$t^X_{03} = \frac{N^X_{03}}{f} = \frac{t_{03} \cdot f_X}{f},$$

and $t^Y_{12}$ is the measured turn-around time from receiving the ranging request packet to transmitting the ranging acknowledge packet by device Y determined as $$t^Y_{12} = \frac{N^Y_{12}}{f} = \frac{t_{12} \cdot f_Y}{f}.$$

The range or distance 110 between device X and Y is $$D_{XY} = t'_p \cdot C$$

where C is the speed of light.

Because the true round trip time is $$2 \cdot t_p = t_{03} - t_{12},$$

the estimation error is $$\Delta t_p = \dot{t}_p - t_p = (t^X_{03} - t^Y_{12}) - (t_{03} - t_{12}).$$

Given that the processing time is much longer than the signal 'flying' time, i.e., $$t_{12} \gg 2t_p, \quad (1)$$

then $$\Delta t_p = (t^X_{03} - t_{03}) - (t^Y_{12} - t_{12})$$
$$= t_{12}\left(\frac{\Delta f_{XY}}{f}\right) + 2t_p\left(\frac{\Delta f_X}{f}\right)$$
$$\approx t_{12}\left(\frac{\Delta f_{XY}}{f}\right),$$

where $\Delta f_X$ is the frequency offset of the timer clock with respect to the nominal frequency f and $\Delta f_{XY}$ is the relative frequency offset between the timer clock for device X and the timer clock for device Y. Equation (1) indicates that reducing $t_{12}$ and $\Delta f_{XY}/f$ improves the time estimation accuracy.

However, in practice, the desired improvements may not be feasible. The value $\Delta f_{XY}/f$ is determined by the components performance, in particular, the crystal oscillator, and a higher accuracy/stability components are more costly and may require more complicated circuitry design.

The processing time $t_{12}$ is often determined by several factors and cannot be reduced easily. These factors include the following. Communication standards usually impose a 'quite' period between transmissions. The receiving device must process the data and pass the packet to an upper layer and the processing time is substantially longer than the round trip time. The packets have a non-zero length.

However, if we obtain an accurate estimation of $\Delta f_{XY}$, then we can improve the accuracy of the time estimation. The flight time estimation of the signals of each packet between the devices (transceivers), with relative clock frequency offset, is $$2 \cdot t^C_p = t^X_{03} - t^Y_{12} \cdot \left(1 - \frac{\Delta f'_{XY}}{f}\right). \quad (2)$$

The estimation error is $$\Delta t_p^C = t_{12}\left(\frac{\Delta f_{XY}}{f}\right) - t_{12}^Y\left(\frac{\Delta f'_{XY}}{f}\right) \quad (3)$$
$$= t_{12}\left[\left(\frac{\Delta f_{XY} - \Delta f'_{XY}}{f}\right) + \left(\frac{\Delta f_{XY} \cdot \Delta f'_{XY}}{f^2}\right)\right]$$
$$= t_{12}\left(\frac{\Delta f_{XY} - \Delta f'_{XY}}{f}\right) + t_{12}\left(\frac{\Delta f_{XY} \cdot \Delta f'_{XY}}{f^2}\right),$$

where $\Delta f'_{XY}$ is the estimated RCFO.

Equation (3) shows that an accurate estimation of relative frequency offset reduces the time estimation error significantly. If an accurate relative frequency clock offset estimation is achieved, i.e., $\Delta f'_{XY} = \Delta f_{XY}$, then first term in Equation (3) becomes zero. The second term is very small because $f >> \Delta f_{XY}$ and $f >> \Delta f'_{XY}$. Therefore, $\Delta t_p^C$ is significantly smaller than $\Delta p$. Hence, the time estimation is very accurate.

To estimate the RCFO, device X measures the second delay $t_{35}$, which is the time elapsed between the reception of the ranging acknowledgement packet 112 and the reception of the ranging data packet 113, as counts $N^X_{35}$. Device Y measures the first delay $t_{24}$, which is the time elapsed between the reception of the ranging acknowledgement packet 112 and the reception of the ranging data packet 113, as counts $N^Y_{24}$.

Device Y transmits the time measurement $N^Y_{24}$ to device X.

Device X determines the relative clock frequency offset (RFCO) $\Delta f_{XY}$ as $$\Delta f'_{XY} \cong \frac{2f(N^Y_{24} - N^X_{35})}{N^Y_{24} + N^X_{35}}, \quad (3)$$

where f is the nominal frequencies of the first and second clocks.

The first delay $N^Y_{24}$ is an exact value as it is the delay between two transmitted packets in device Y. The second delay $N^X_{35}$ is the time difference between two received packets by device X.

Then, device X can then determine $t^C_p$ using Equation (2).

The value of the first delay $N^Y_{24}$ can be made known to device X using methods including, but not limited to the following:

$N^Y_{24}$ is predetermined by the network;
$N^Y_{24}$ is predetermined by device Y and transmitted in the ranging acknowledgement packet 112;
$N^Y_{24}$ is transmitted in the ranging data packet 113; and
$N^Y_{24}$ is transmitted to device X in some other packet.

It should be understood, the device Y can also determine the RCFO similarly provided with the second delay.

In the cases when the value of RCFO $\Delta f_{XY}$ is relatively stable, the RCFO estimation can be performed periodically.

Effect of the Invention

Compared with conventional method, the invention has the following advantages.

The invention does not require a modification of a structure of packets that are used to perform the ranging or data communication.

Any effect of channel impulse response, RF circuit and baseband circuit imperfection are cancelled.

Any quantization error caused by a finite period of the clock can be reduced by increasing the first delay.

The accuracy of estimating the RCFO is high.

The requirement for additional hardware, computation and power is very low.

The method is compliant with the IEEE 802.15.4a standard, and does not require a modification to the media access (MAC) protocol used by that standard.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for improving two-way radio ranging accuracy by estimating a relative clock frequency offset between a first clock X of a first transceiver and a second clock Y a second transceiver, comprising:
   transmitting, by the first transceiver, a first packet at time $t_0$ of the first clock X;
   receiving, by the second transceiver, the first packet at a time $t_1$ of the second clock Y;
   transmitting, by the second transceiver, a second packet at a time $t_2$ of the second clock;
   receiving, by the first transceiver, the second packet at a time $t_3$ of the first clock X;
   transmitting, by the second transceiver, a third packet at a time $t_4$ of the second clock Y;
   receiving, by the first transceiver, the third packet at a time $t_5$ of the first clock X, and calculating the relative clock frequency offset by the first transceiver in which the relative clock frequency offset is $$\Delta f'_{XY} \cong \frac{2f(N^Y_{24} - N^X_{35})}{N^Y_{24} + N^X_{35}},$$

where f is a nominal clock frequency of the first and second clocks, $N^Y_{24}$ is a measured first delay between times $t_2$ and $t_4$ of the second clock, $N^X_{35}$ is a measured second delay between times $t_3$ and $t_5$ of the first clock X; and
   canceling an effect of channel impulse response, RF circuit and baseband circuit imperfection while determining the relative clock frequency offset.

2. The method of claim 1, further comprising:
   measuring a distance between the first transceiver and the second transceiver based on the relative clock frequency offset.

3. The method of claim 1, in which the first delay is predetermined by a network in which the first and second transceivers operate.

4. The method of claim 1, in which the first delay is predetermined by the second transceiver and transmitted in the second packet.

5. The method of claim 1, in which the first delay is transmitted in the second packet.

6. The method of claim 1, in which the first delay is transmitted by the second transceiver to the first transceiver in the third packet.

7. The method of claim 1, in which a structure of the first and second packets complies with a communications standard.

8. The method of claim 1, further comprising:
   increasing the first delay to reduce quantization errors.

9. The method of claim 1, in which an estimated flight-time of the signals between the first and second transceivers is $$t_p^C = \frac{1}{2}\left(t_{03}^X - t_{12}^Y \cdot \left(1 - \frac{\Delta f'_{XY}}{f}\right)\right),$$

in which $t^X_{03} = t_3 - t_o$ measured by the first clock X, and $t^Y_{12} = t_2 - t_1$ measured by clock Y.

10. A system for improving two-way radio ranging accuracy by estimating a relative clock frequency offset between a first clock X of a first transceiver and a second clock Y a second transceiver, comprising:

a first transceiver transmits a first packet at time $t_0$ of a first clock X;

a second transceiver receives the first packet at a time $t_1$ of a second clock Y, and in which the second transceiver transmits a second packet at a time $t_2$ of the second clock, which is received by the first transceiver at a time $t_3$ of the first clock X, and in which the second transceiver transmit a third packet at a time $t_4$ of the second clock Y, which is received by the first transceiver at a time $t_5$ of the first clock X, and the first transceiver calculates the relative clock frequency offset in which the relative clock frequency offset is $$\Delta f'_{XY} \cong \frac{2f(N^Y_{24} - N^X_{35})}{N^Y_{24} + N^X_{35}},$$

where f is a nominal clock frequency of the first and second clocks, $N^Y_{24}$ is a measured first delay between times $t_2$ and $t_4$ of the second clock, $N^X_{35}$ is a measured second delay between times $t_3$ and $t_5$ of the first clock X, wherein an effect of channel impulse response, RF circuit and baseband circuit imperfection is canceled while determining the relative clock frequency offset.

\* \* \* \* \*